J. RILEY.

Straw, Hay and Root Cutter.

No. 77,762. Patented May 12, 1868.

United States Patent Office.

JAMES RILEY, OF DETROIT, MICHIGAN.

Letters Patent No 77,762, dated May 12, 1868.

STRAW-CUTTER.

*The Schedule referred to in these Letters Patent and making part of the same.*

TO ALL WHOM IT MAY CONCERN:

Be it known that I, JAMES RILEY, of Detroit, in the county of Wayne, and State of Michigan, have invented certain new and useful Improvements in "Straw, Hay, and Root-Cutters;" and do hereby declare that the following is a full, clear, and exact description thereof, reference being had to the accompanying drawings, and the letters of reference marked thereon, making a part of this specification.

Figure 1:
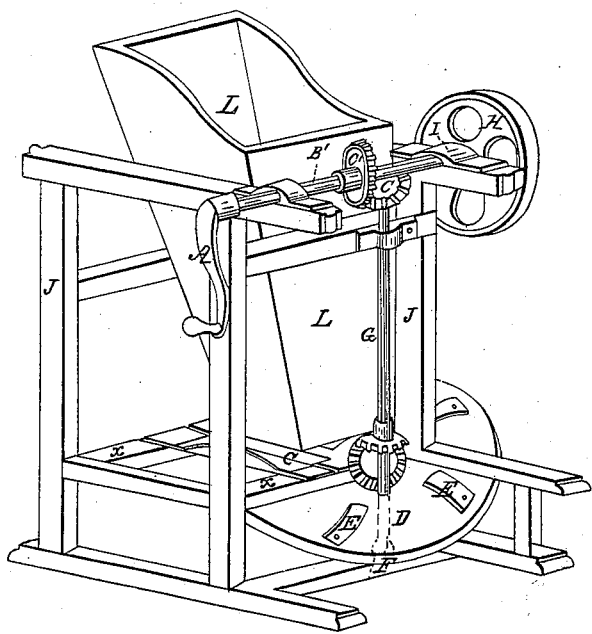

Figure 1 represents a perspective view of the cutter, and

Figure 2:
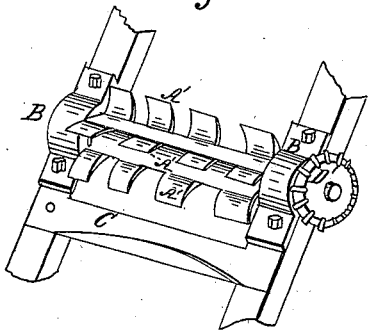

Figure 2 a view of the feeder which sits in the bottom of the hopper.

In the annexed drawings, J represents the frame of the machine, which is composed of four or more uprights suitably braced together, within which is secured the hopper L. This hopper is placed with its lower end resting upon the cross-pieces X at the lower portion of the frame J, and may be constructed of any suitable form.

G represents a vertical shaft, secured at the outer end of the frame, which has a faced cog-wheel, C, at its upper end, while the lower end has its bearings upon the base of the frame. This shaft passes through the centre, and is firmly connected to the circular revolving plate D. This plate is secured so that it is directly beneath the stays X X of the frame J, and under the hopper L.

E E represent the knives, which are placed at suitable intervals upon the upper face of the horizontal plate D, and by which means the straw, &c., is cut. These knives are so placed as to leave a small space between each and the slot of the plate, so as to allow the fodder to drop beneath the wheel, and prevent the choking of the same.

C represents a metallic frame, having its bearing upon the pieces X X, and suitable journals for the feeder-shaft. This frame is attached to the pieces X X by means of a pin, (not shown,) which passes through an opening in its side and into the pieces X X, and can be forced in under the hopper or drawn out by the subtraction or reinsertion of the pin.

The object of this sliding frame is to place the feeder under the hopper, when cutting straw, hay, or other fine fodder; but in cutting roots and other similar articles, the frame and feeder are not required, and are consequently withdrawn from beneath the hopper. This feeder is constructed of one piece of metal, with an oblong opening in its centre, for the insertion of the shaft B, and composed of four or more curved slotted plates, A' A' A', which effectually carry the hay, straw, &c., down upon the revolving plate D.

B' represents a horizontal shaft, having a crank, A, upon one end, and a belt-wheel, H, upon the other, which is secured by suitable journals upon the outer end of the frame J, and which is provided near its centre with a faced cog-wheel, C', which meshes into the cog C upon the upper end of the shaft G.

By turning this crank or wheel H, the shaft G, which is connected to the plate D, revolves the knives and cutter, and whenever the machine is used for cutting hay, straw, &c., the feeder A', by means of its faced cog D', meshing into a small inverted faced cog on the shaft G.

Having thus fully described my invention, what I claim as new, and desire to secure by Letters Patent, is—

The arrangement of the sliding frame C with feeder A', when used in combination with the revolving cutter D and hopper L, and operated in the manner substantially as and for the purposes herein set forth.

Dated at Detroit, Michigan, this 7th day of December, A. D. 1865.

JAMES RILEY.

Witnesses:
W. S. ATWOOD,
H. GRANGER.